Aug. 9, 1932.  M. E. LOEHR  1,870,520
FISHLINE FLOAT
Original Filed July 8, 1929
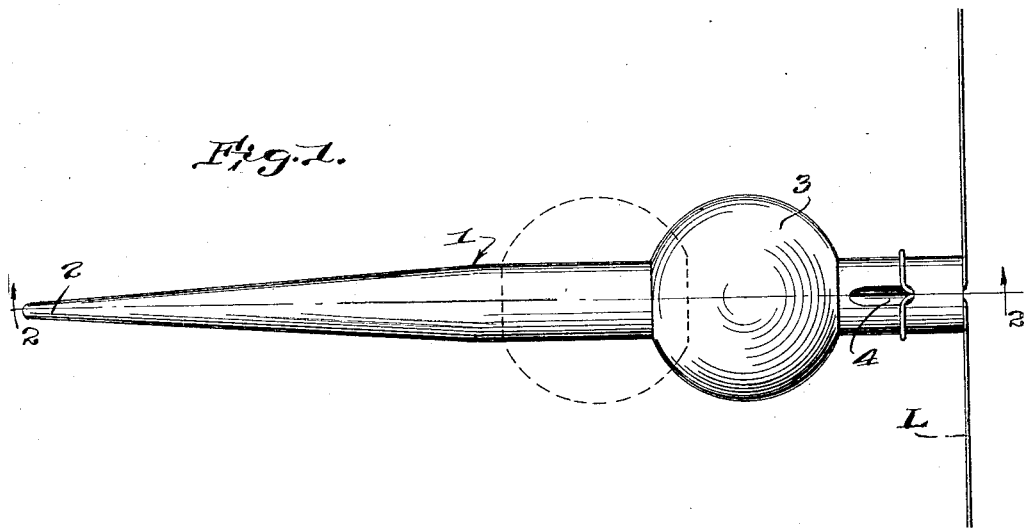
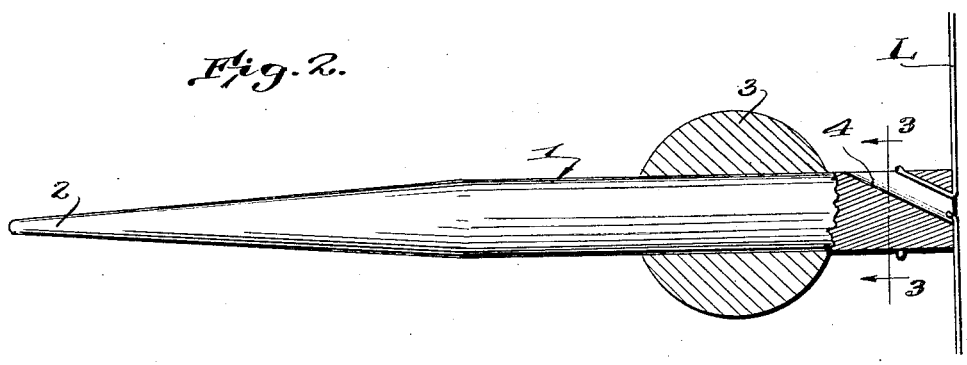
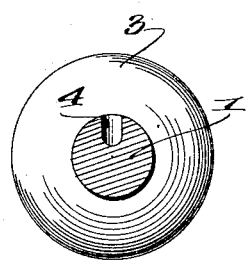
WITNESS
C. B. Shillinger
INVENTOR
M. E. Loehr
BY
ATTORNEY Patented Aug. 9, 1932

1,870,520

UNITED STATES PATENT OFFICE

MILES E. LOEHR, OF CLAYPOOL, INDIANA

FISHLINE FLOAT

Application filed July 8, 1929, Serial No. 376,779. Renewed January 2, 1932.

This invention relates to fishing tackle and more particularly to floats for fish lines.

A primary object of the invention is to provide a float which may be quickly and easily applied to a fishing line and after being applied may be quickly adjusted to vary the depth of the line when fishing.

Another object of the invention is to provide a float of this character which normally retains a horizontal position when floating on the water and which by the slightest touch of the hook by a fish will instantly tip and rise to perpendicular position.

Another object is to provide a float of this character so constructed as to be extremely sensitive causing it to operate quickly in response to the touch of the fish on the hook and which will ride the largest waves and remain in horizontal position.

Another object is to provide a float the parts of which are adjustable to vary the responsiveness of the float to cause it to be either quick or sluggish in its movement.

Another object is to so construct and connect the float with the line that it will be almost impossible to tangle the line on the float.

In carrying out these objects, the invention is susceptible of a wide range of modification without departing from the spirit or sacrificing any of the advantages of the claimed invention; there being shown in the drawing for illustrative purposes a preferred and practical form, in which:

Figure 1 is a side elevation of a float constructed in accordance with this invention shown applied to a line the cork carried thereby being shown in advance position in dotted lines;

Fig. 2 is a similar view taken in a plane at right angles with the cork in section and a portion of the float body in section; and Fig. 3 is a transverse section taken on the line 3—3 of Fig. 2.

The float constituting the invention comprises a body member 1 preferably composed of light wood and tapered toward one end as shown at 2. This member constitutes what is usually known as the stem of a fishing line float and has adjustably mounted thereon a spherical float member 3 of cork. This ball-like member 3 has an opening extending diametrically therethrough at the center thereof to receive the body 1 and to fit snugly thereon so that it will remain in any position on such stem to which it may be adjusted. The spherical shape of this cork 3 causes it to offer a minimum amount of resistance so that the slightest pull on the hook carrying portion of the line will cause the float to swing upwardly indicating to the fisherman that he has a bite. This cork 3 is removable from the stem 1 so that for fishermen preferring a perpendicular float it may be readily provided by simply removing the cork. For quick movement of the float the cork ball 3 should be closer to where the line fastens and to make a sluggish movement move the cork ball farther out toward the end of the stem.

At the larger end of the stem 1 is a longitudinally extending bore 4 arranged obliquely and opening through one side wall of the stem as is shown clearly in Fig. 2 and which is designed to receive the line. The line L is doubled at a point about the depth desired and the loop is passed through the bore at the end of the stem and out through said bore at the side wall of the stem. This loop is then spread and slipped over the tapered end of the stem encircling the body portion thereof as shown in Fig. 1. Then a slight pull exerted on the line secures it firmly to the float. To adjust the line and the cork the loop portion of the line is grasped and pulled through the stem and then the portion of the line is pulled through according to whether it is desired to fish deeper or shallower. It is thus obvious that the line may be quickly and easily adjusted and when in one place will stay put, and owing to the fact that the ends of the line extend out through the end of the stem all possibility of entanglement of the line with the float is prevented. The float is of such a weight that it can be thrown out against any wind with ease and yet makes no splash when lighting in the water. If the cork 3 be moved to about midway the length of the stem the float will stand perpendicular. If the float be sufficiently large the cork 3 may be removed and the stem will stand perpendicular.

It will thus be seen that this float is convertible to adapt it to lie either horizontally or to stand perpendicularly at the will of the user.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

What is claimed is:

A fishline float comprising a stem of buoyant material tapered towards one end and having bore extending longitudinally and obliquely from the larger end and opening through one side wall of the stem, a line having a loop formed thereon and extended through the bore in said larger stem end and passed around the stem, one end of said line extending in one direction and the other end in the opposite direction, one being designed to carry the sinkers and hooks, the other to be held and manipulated by the fisherman, and a buoyant member slidably mounted on said stem and adjustable toward and away from the larger end to vary the sensitiveness of the float.

MILES E. LOEHR.